(12) United States Patent
Nieding et al.

(10) Patent No.: US 6,799,481 B2
(45) Date of Patent: Oct. 5, 2004

(54) TORSION MODULE OF A TORQUE DETECTION DEVICE

(75) Inventors: Klaus Nieding, Halver (DE); Ralf Böbel, Holzwickede (DE); Frank Bläsing, Werl (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/657,598

(22) Filed: Sep. 8, 2003

(65) Prior Publication Data

US 2004/0159165 A1 Aug. 19, 2004

Related U.S. Application Data

(63) Continuation-in-part of application No. PCT/EP02/03164, filed on Mar. 21, 2002.

(30) Foreign Application Priority Data

Mar. 23, 2001 (DE) .......................................... 101 14 688

(51) Int. Cl.[7] .............................. G01L 3/02; G01L 3/10; G01L 3/14
(52) U.S. Cl. ................................................. 73/862.338
(58) Field of Search ...................... 73/862.26, 862.321, 73/862.325, 862.391, 862.338, 862.451, 862.472, 862.473, 862.632, 862.637

(56) References Cited

U.S. PATENT DOCUMENTS

| | | |
|---|---|---|
| 2,403,952 A | 7/1946 | Ruge |
| 3,620,073 A | 11/1971 | Robbins |
| 4,712,433 A * | 12/1987 | Hochstein et al. ..... 73/862.334 |
| 4,748,844 A | 6/1988 | Yoshikawa et al. |
| 5,027,663 A | 7/1991 | Frister et al. |
| 5,165,288 A | 11/1992 | Timtner |
| 5,195,383 A * | 3/1993 | Tanaka et al. .......... 73/862.325 |
| 5,672,834 A * | 9/1997 | Searle et al. ........... 73/862.338 |
| 5,753,828 A * | 5/1998 | Madni et al. .......... 73/862.338 |
| 6,230,555 B1 | 5/2001 | Doerrie et al. |
| 6,402,196 B1 | 6/2002 | Nicot |

FOREIGN PATENT DOCUMENTS

| | | |
|---|---|---|
| DE | 27 34 182 A1 | 7/1977 |
| DE | 37 15 472 C2 | 5/1987 |
| DE | 37 37 696 A1 | 11/1987 |
| DE | 40 14 521 C2 | 5/1990 |
| DE | 196 50 477 C1 | 12/1996 |
| EP | 0 442 091 A1 | 12/1990 |
| FR | 2 774 348 | 2/1998 |

* cited by examiner

*Primary Examiner*—Edward Lefkowitz
*Assistant Examiner*—T Miller
(74) *Attorney, Agent, or Firm*—Brooks Kushman P.C.

(57) ABSTRACT

A torsion module includes first and second rings (9, 9') and a spoked wheel (8). The first ring is attachable to a steering wheel (13). The spoked wheel is attached on top and bottom sides to the rings and has bending spokes which join a rim to a hub. The bending spokes bend in response to rotation angle offset between the hub and rim caused by torque on the steering wheel. A sensor, placed on a bending spoke, generates a signal indicative of bending experienced by the bending spoke in response to rotation angle offset between the hub and rim. The spoked wheel includes bending-resistant limit stop spokes each having a free end. The free ends engage the rim to limit rotation angle offset between the hub and rim. The rings have axially separated limit stops which enclose the free ends to prevent axial movement between the hub and rim.

7 Claims, 5 Drawing Sheets

TORSION MODULE OF A TORQUE DETECTION DEVICE

CROSS-REFERENCE TO RELATED APPLICATIONS

This is a continuation of International Application PCT/EP02/03164, published in German, with an international filing date of Mar. 21, 2002.

BACKGROUND OF THE INVENTION

1. Field of the Invention

The present invention relates to a torsion module of a torque detection device of a steering system or of a steering power-assist system for a motor vehicle, the torque detection device including a spoked wheel that can be fastened to a steering wheel, the spoked wheel having a hub and a rim, the rim being arranged concentric to the hub and being joined to the hub by bending spokes.

2. Background Art

Electric steering power-assist systems are being used in motor vehicles to an increasing extent. The torque exerted on the steering wheel is required as a command variable, so that the desired steering power-assist can take place by using the ascertained torque. To detect the torque, a torsion module that permits a rotation angle offset between the steering wheel and the steering shaft when a torque is applied is used.

In the case of the device described in DE 27 34 182, an object is used as the torsion module, which is formed of two rings at a distance from each other in the axial direction. The two rings are connected to each other by metal strips placed at the same angular distance from each other. The top ring is connected in non-rotating fashion with the steering wheel and the lower ring is connected in non-rotating fashion with the steering shaft of the steering column. When a torque is applied to the steering wheel and thus to the upper ring, the metal strips experience a torsion and are subjected to bending. The extent of the bending of the metal strips provides information regarding the applied torque.

To ascertain this value, strip strain gauges that are attached to an evaluation unit are mounted on several of the metal strips. In the case of the object of this document, the metal strips that connect the two rings that are placed at an axial distance from each other are used as the actual torsion element. The disadvantage with the design of this torsion module is the relatively large overall height in the axial direction. It is exactly in this direction that very little space is available, especially in modern motor vehicles.

Additional disadvantages related to the object of DE 27 34 182 A1 are that movements of the steering wheel relative to the steering shaft in the axial direction also result in a deflection of the metal strips, with such a deflection being detected as a torque present at the steering wheel. Accordingly, a triggering of the steering power-assist system takes place without a torque actually being present at the steering wheel. As a result, this system is especially unsuitable for use within the context of a steering system in which the actual deflection of the wheels is produced only by means of, for example, an electrical system.

Torsion modules are also known in which two elements are placed concentric with each other as described in DE 37 37 696 A1, for example. In the case of the object of this torsion module, an interior hub is connected by means of spokes configured as bending rods to an external rim that is placed concentric with the hub. Connecting parts that transmit the given movement to one measurement transducer are each placed axially from the elements that are movable relative to each other—i.e., the hub and the rim—so that a rotation offset between the rim and the hub can be registered according to the eddy current principle. The measuring device known from this document also requires installation space in the axial direction that is not always available.

In the case of the object of DE 37 37 696 A1, the torsion module, or more specifically, the evaluation unit coupled with the torsion module, is relatively insensitive to axial movements between the steering wheel and the steering shaft. While the bending spokes also bend with such a movement, such a movement does not lead to the generation of a steering signal due to the measuring sensor that is used.

Torsion modules have also been used for measuring the braking torque in a motor vehicle, as is described in DE 196 50 477 C1, for example. In the case of the torsion module described in this document, strip strain gauges are placed on the bending spokes in order to detect the rotation angle offset between the hub and the rim. In order to limit the maximum possible rotation angle offset between the hub and the rim, limit stop spokes that protrude from the hub and that engage in a recess in the rim are provided alternately with the bending spokes, which limits the maximum rotation angle offset. The wheel of a motor vehicle can be fastened to the rim.

For this purpose, the rim of the torsion module is set back from the mounting surface for the tires that is formed by the hub, so there is no danger that after a wheel is mounted on the limit stop spokes of the hub, the hub will lie against the bending spokes. A limitation of the axial movements between hub and rim is neither provided for nor necessary with the measuring device known from this document, because such movements between the hub and the brake disc mounted on the rim do not occur.

SUMMARY OF THE INVENTION

Starting from the state of the art discussed above, the present invention is thus based on the task of making available a torsion module that satisfies the requirements relative to the axial installation space needed with a torque detection device of a steering system or steering power-assist system, and which does not lead to misinterpretations in the event the steering wheel is contacted by forces acting in axial directions.

According to the present invention, this task is solved in that a pressure-sensitive or expansion-sensitive measuring sensor that generates electrical output signals is placed directly on a region of a bending spoke that is subject to bending in the event of a rotation angle offset between the rim and the hub, and in that placed alternately with the bending spokes are bending-resistant limit stop spokes, each of which has a free end that protrudes radially from the hub and engages in a limit stop arrangement in order to prevent a metrologically effective (i.e., measurable) relative movement between the rim and hub in the axial direction.

In contrast to the object of DE 37 37 696 A1, in the torsion module according to the present invention the measuring sensors are located directly on the bending spokes so that the required axial installation space is determined solely by the extension of the rim and the bending spokes in this direction. Foil-like strip strain gauges are preferred as measuring sensors because they are relatively easy to handle. The strip strain gauges are connected to an evaluation unit that does not, however, need to be part of the torsion module, but can instead be located in a steering wheel module or a steering column module, for example.

The torsion module of the present invention is especially advantageous with the concentric arrangement between the rim, configured, for example, as a ring body and thus as a rim that completely surrounds the hub, and the hub, because these elements are placed essentially in one plane. To avoid a misinterpretation of measured values from the measuring sensors due to a bending of the bending spokes in response to a relative axial movement between the steering wheel and the steering shaft, such a bending of the bending spokes in the axial direction is easily counteracted through placement of limit stops.

Such limit stops can be realized, for example, in that placed alternately with the bending spokes are limit stop spokes, which protrude radially from the hub. Each of the limit stop spokes engages with its free end in a limit stop arrangement. Each limit stop arrangement includes two limit stops placed at a distance from each other in the axial direction. The inside width of the spacer opening essentially corresponds to the material thickness of a limit stop spoke. Such limit stops can be simply realized in that a spacer ring that bears an inward-pointing projection in the region of each of the free ends of a limit stop spoke is placed, for example, on both the top and bottom of the rim. In place of one or both of the rings with such projections, such a limit stop can also be formed by an additional element, for example, the base plate of a steering wheel.

To provide overload protection, it is useful to limit the possible rotation angle offset between the hub and the ring by means of limit stop spokes. For example, to realize such a rotational angle limit stop arrangement, two bulges that protrude inward from the rim can be provided. The bulges have a distance from each other such that the free end of a limit stop spoke can engage therein, and specifically, with play that corresponds to the maximum rotation angle offset between the rim and the hub.

A torsion module with such a very flat design is especially well-suited for placement in a steering wheel module of a steering wheel. With the steering wheel module, the torsion module can form the lower element that is connected with the base plate of a steering wheel. The base plate of the steering wheel is then connected to the rim, while the hub of the torsion module is mounted in non-rotating fashion to the steering shaft of a steering column. The evaluation unit for reading the measurement results of the measuring sensors, the strip strain gauges for example, is also usefully placed in the steering wheel module, which can simultaneously be the carrier for an airbag device.

BRIEF DESCRIPTION OF THE DRAWINGS

In the following, the present invention will be explained with the aid of an embodiment with references to the attached Figures.

DETAILED DESCRIPTION OF THE PREFERRED EMBODIMENT(S)

Figure 1:
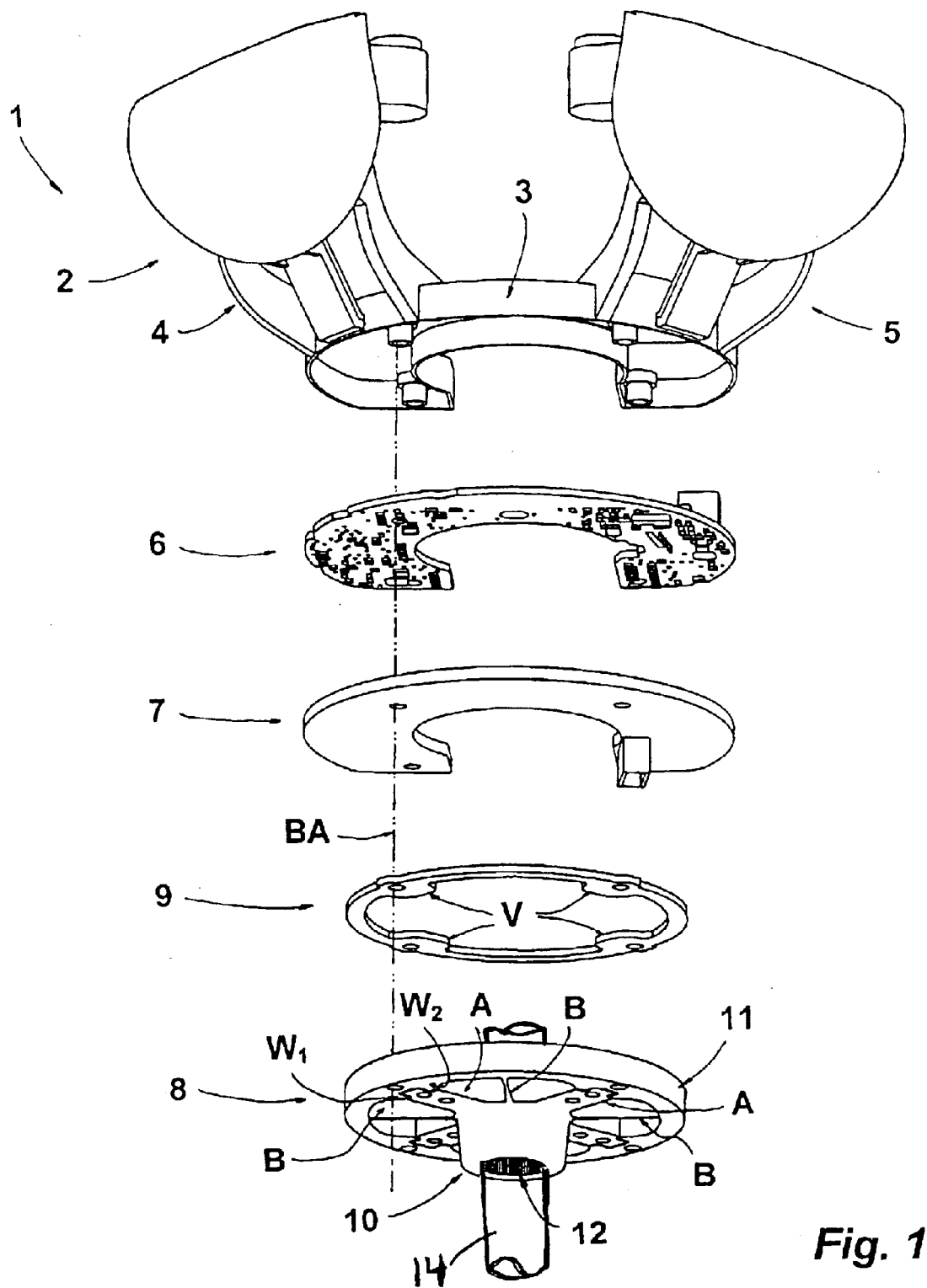
FIG. 1 illustrates a steering wheel module for the steering wheel of a motor vehicle, in an exploded view, with a spoked wheel as the torsion module of a torque detection device in accordance with the present invention.

A steering wheel module 1 for use in a motor vehicle includes a carrier 2 with a housing 3 and support arm arrangements 4 and 5. Support arm arrangements 4 and 5 project upward from housing 3 and on the top of which receptacles are placed for electric switches or switch arrangements. Support arm arrangements 4 and 5 are designed so that the assemblies that are to be operated by them are placed laterally alongside the airbag cover of a steering wheel. Inserted in housing 3 is a circuit board 6 having, among other things, the power electronics required for operating the electrical/electronic assemblies supported in support arm arrangement 4 and 5. Housing 3 is closed on the bottom by a lower cover 7.

Forming the lower termination of steering wheel module 1 is a spoked wheel 8. Spoked wheel 8 is used as the torsion module for a torque detection device and is kept at a distance from lower cover 7 by a spacer ring 9. Spoked wheel 8 includes four bending spokes B. Bending spokes B connect a hub 10 of spoked wheel 8 with a ring body 11 that concentrically surrounds hub 10 in the form of a rim. Hub 10 has an assembly channel 12 with multiple toothing, which assembly channel 12 is used for holding the free end of a steering shaft of a steering column. Spoked wheel 8 is connected in non-rotating fashion to the steering shaft of a steering column by means of hub 10.

Bending-resistant limit stop spokes A extend radially from hub 10 toward ring body 11. Bending-resistant limit stop spokes A are placed alternately with bending spokes B. Each bending-resistant limit stop spoke A engages with its free end in a limit stop arrangement. Each limit stop arrangement includes two bulges $W_1$, $W_2$ formed on ring body 11. Bulges $W_1$, $W_2$ are separated from one another by a limit stop gap. The free ends of bending-resistant limit stop spokes A engage ring body 11 in between bulges $W_1$, $W_2$ to limit the maximum rotation angle offset between ring body 11 and hub 10.

Each of bending spokes B is equipped with a strip strain gauge D (cf. FIG. 2), by means of which detection takes place of the bending contribution and thus of a relative rotation angle offset between ring body 11 and hub 10. Strip strain gauges D are connected to an evaluation device (not shown) that is also part of steering wheel module 1.

In each area of its regions adjacent to the limit stop arrangements formed by bulges $W_1$, $W_2$, spacer ring 9 has inwardly pointing projections V that each lie against the top of bulges $W_1$, $W_2$ and cover the limit stop gap formed by bulges $W_1$, $W_2$. Correspondingly enclosed is the free end of bending-resistant limit stop spokes A, including the bottom side, either by an additional spacer ring 9' corresponding to spacer ring 9, or by another element, for example, the base plate of a steering wheel.

As a result of the enclosure of the free ends of bending-resistant limit stop spokes A, a relative movement between hub 10 and ring body 11 in the axial direction is limited so that in the event of effects from axial forces and/or in the event of effects of bending moments introduced into spoked wheel 8 through the steering wheel, impermissibly large bending of bending spokes B does not occur. This serves to limit the elastic deformation of the spring body under the effect of unexpected forces, and to avoid misinterpretations of strip strain gauges D assigned to bending spokes B, which would otherwise generate a measurement signal reflecting a bending of a bending spoke B, even in the case of such relative movement.

The free ends of bending-resistant limit stop spokes A are limit-stop delimited with play in the limit stop gaps along the rotation direction by bulges $W_1$, $W_2$, and are used as overload protection for bending spokes B. By contrast, the free ends of bending-resistant limit stop spokes A are surrounded as closely as possible in the axial direction, for example, by the projections V of spacer ring 9 and 9' illustrated in FIG. 1.

All of the elements of steering wheel module 1—carrier 2, circuit board 6, lower cover 7, spacer ring 9, and spoked wheel 8—have four bore holes, each aligned with the others, so that these elements can be jointly connected with each other by means of four fastening bolts. One of these four fastening axes is identified in FIG. 1 by the reference symbol BA. In the case of the embodiment shown, the fastening bolts pass through the individual elements of steering wheel module 1 and are fastened by their threads in the center of a steering wheel. Spoked wheel 8 that is assigned to steering wheel module 1 is thus used for coupling the steering wheel to a steering shaft 14.

Figure 2:
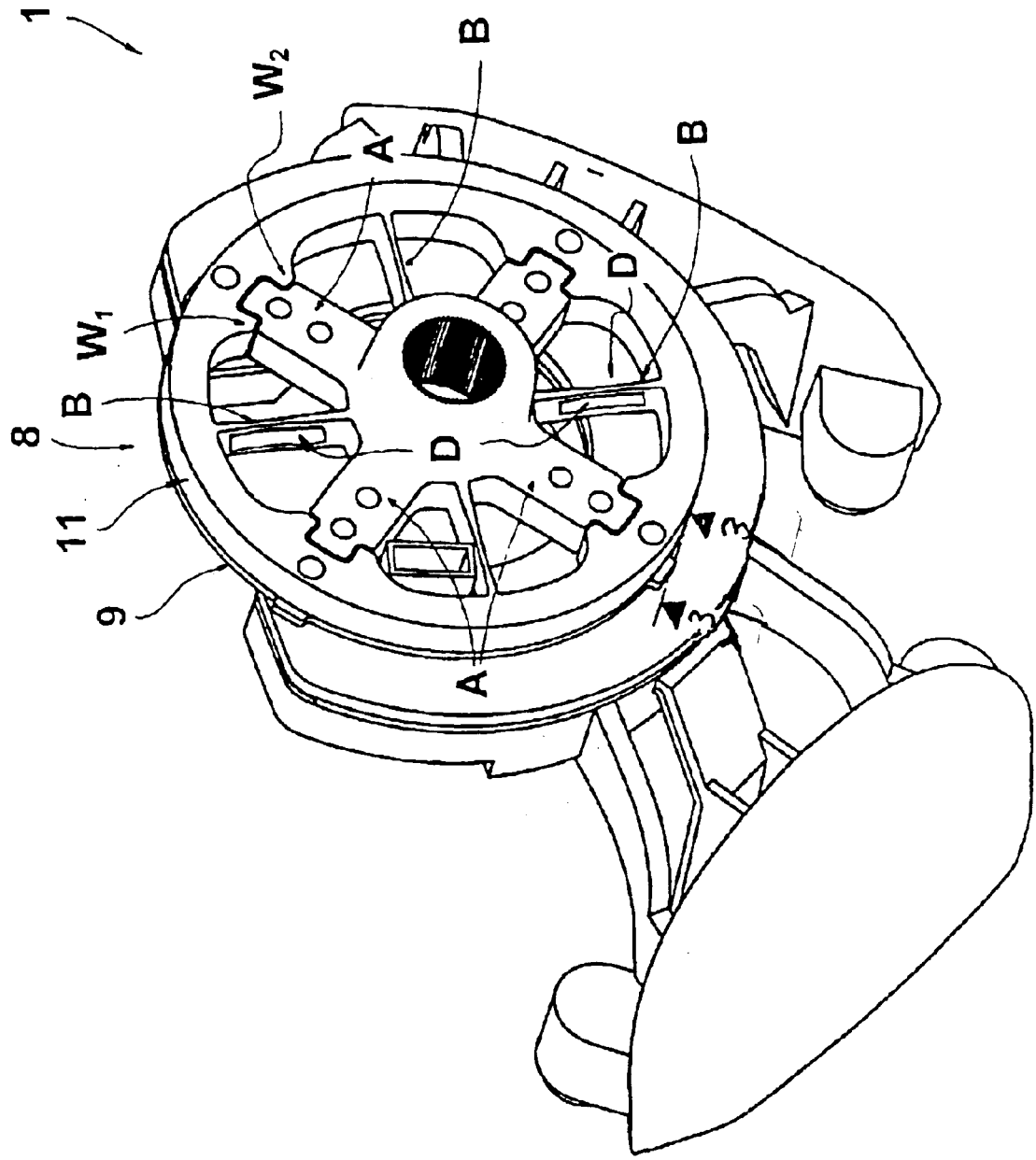
FIG. 2 illustrates a bottom side view from of the steering wheel module of FIG. 1.

FIG. 2 illustrates spoked wheel 8 as the lower part of steering wheel module 1. In this view, it can be seen that two bending spokes B are both equipped on both sides with strip strain gauges D. Strip strain gauges D are connected to circuit board 6 in housing 3 of steering wheel module 1 (not shown). The placing of multiple strip strain gauges D on two bending spokes B is used to increase the measurement accuracy by providing a certain information redundancy. It can also be seen in FIG. 2 that bending-resistant limit stop spokes A have a much greater cross-sectional area than bending spokes B, and are thus resistant to bending relative to bending spokes B.

In this representation of spoked wheel 8 shown in FIG. 2 as the lowest part of steering module 1, the top of ring body 11 abuts spacer ring 9, as a result of which the free ends of bending-resistant limit stop spokes A are covered by the projections V that project inward from spacer ring 9. In one configuration, placed adjacent to ring body 11 at the bottom is an additional spacer ring 9' (cf. FIG. 3), which is constructed in the same way as spacer ring 9 which lies adjacent to ring body 11 on the top.

Figure 3:
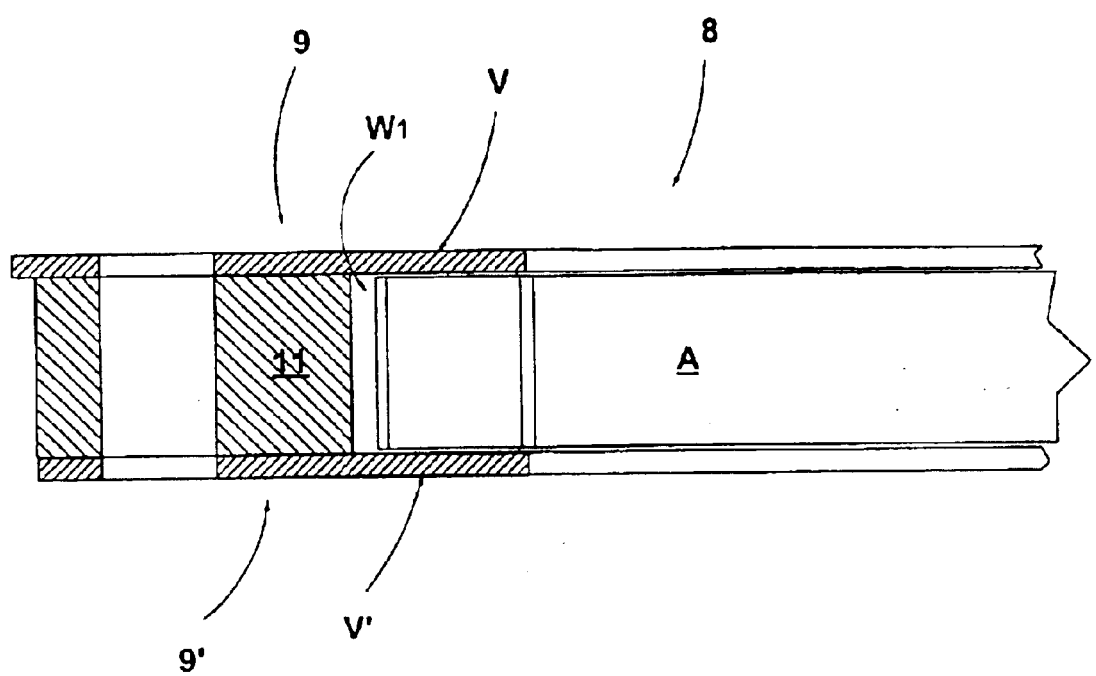
FIG. 3 illustrates a partial section view along the line 3-3 of FIG. 2.

FIG. 3 illustrates a section through such a limit stop arrangement formed by the two spacer rings 9, 9'. Here it can be seen that at least in the region of its free end, the thickness of a bending-resistant limit stop spoke A is less than the thickness of ring body 11. This is done so that a relative movement between ring body 11 and the bending-resistant limit stop spoke A that is connected to hub 10 is not impaired. The play that remains between the top or bottom of bending-resistant limit stop spoke A and the projections V or V' of spacer ring 9 or 9' is so small that a bending of a bending spoke B of that extent does not lead to generation of a signal.

Figure 4:
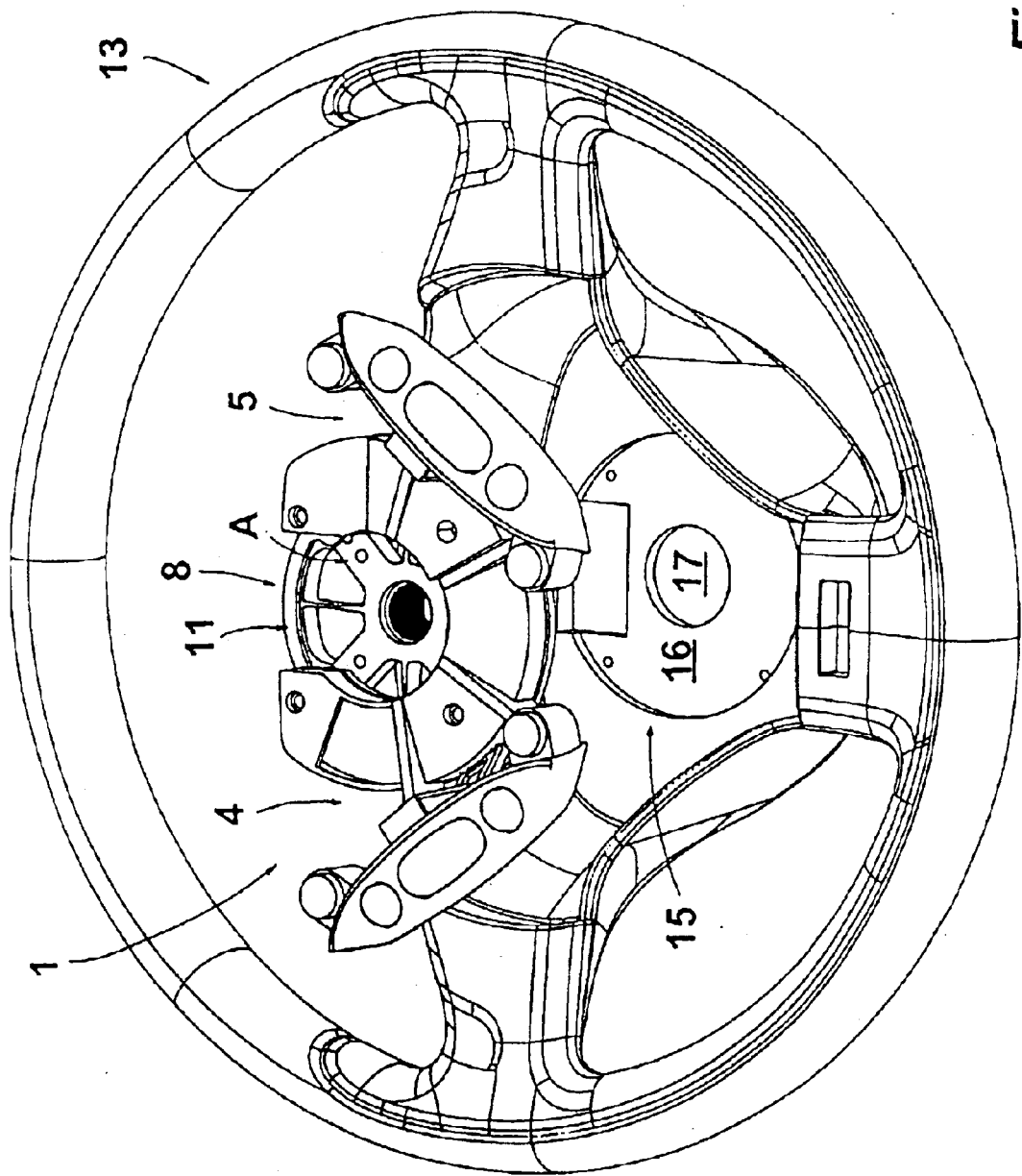
FIG. 4 illustrates a top side exploded view of the steering wheel module of FIG. 1 inserted into a steering wheel.

The assembled steering wheel module 1 illustrated in FIG. 4 is placed axially aligned with a steering wheel 13, in that the former is mounted in the center 15 of the steering wheel. Steering wheel module 1 is also used for holding an airbag device, not shown, which when installed is placed between the two support arm arrangements 4 and 5 with the electrical switches. Center 15 of steering wheel 13 is formed by a circular recess 16 with a central opening 17 through which hub 10 of steering wheel module 1 passes. Also visible are threaded bore holes for the insertion of fastening bolts for mounting steering wheel module 1 on steering wheel 13. The top of the recess 16 lies against the bottom of ring body 11 of spoked wheel 8 so that the lower limit stop for bending-resistant limit stop spokes A of spoked wheel 8 is represented by this area.

Figure 5:
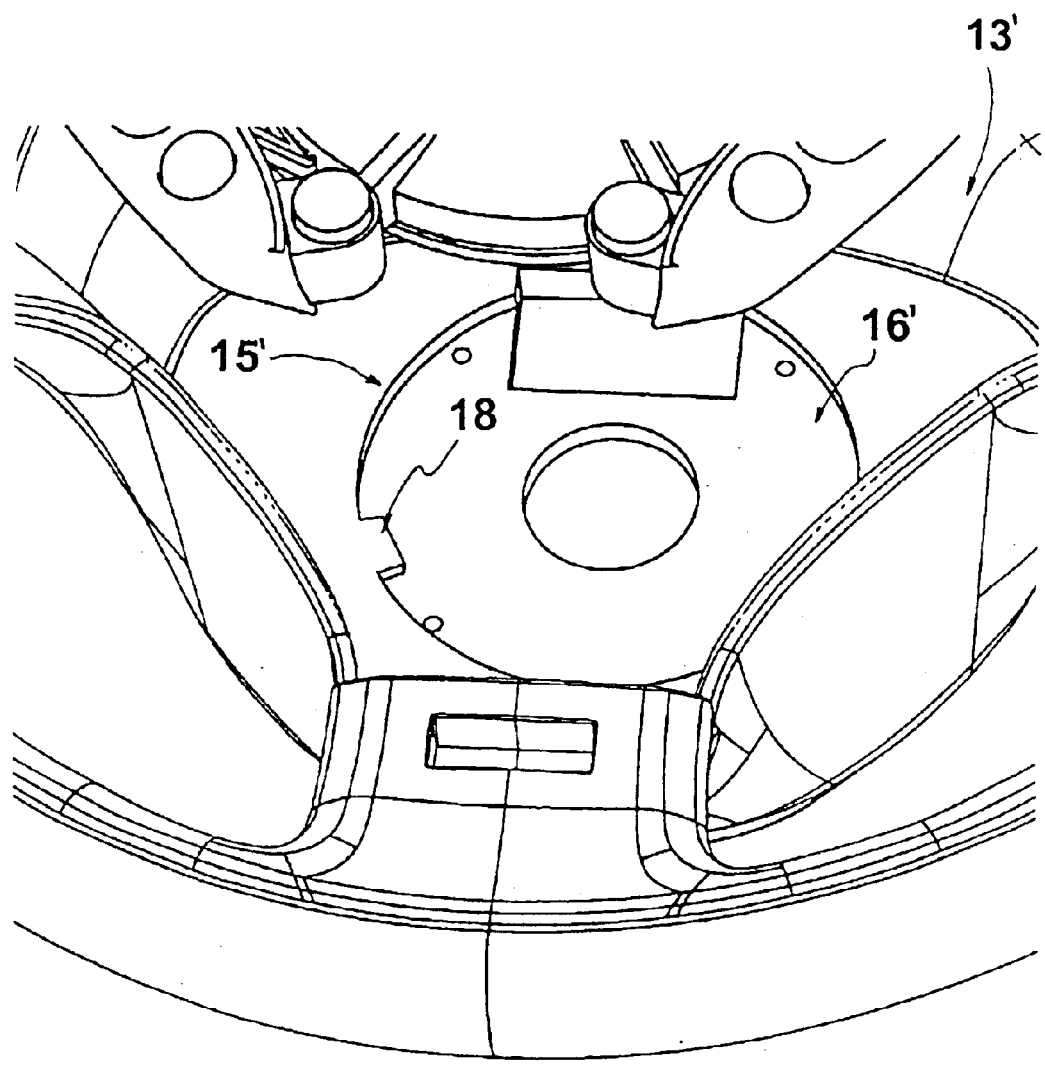
FIG. 5 illustrates an enlarged view of the center of the steering wheel according to an additional configuration in accordance with another embodiment of the present invention.

FIG. 5 illustrates an additional configuration of a steering wheel 13', the center 15' of which is in principle designed in the same way as center 15 of steering wheel 13. Unlike the configuration of recess 16 of steering wheel 13, recess 16' of steering wheel 13' has torque supports 18 that project inward like lugs, one of which is shown in FIG. 5. For example, a total of three such torque supports are provided, distributed circumferentially.

A spoked wheel for a torque detection device to be inserted into the recess 16' has a recess that is formed in complementary fashion in the outer ring body, so that torque supports 18 engage positively in the ring body. In this way, the quality of a connection, for example, a bolted connection between the steering wheel base and the spoked wheel, is increased, because any conflicting actions between these two elements is prevented by the positive locking of torque supports 18 and the ring body of the spoked wheel.

List of Reference Symbols

1 Steering wheel module
2 Carrier
3 Housing
4 Support arm arrangement
5 Support arm arrangement
6 Circuit board
7 Lower cover
8 Spoked wheel
9, 9' Spacer ring
10 Hub
11 Ring body
12 Assembly channel
13, 13' Steering wheel
14 Steering shaft
15, 15' Center
16, 16' Recess
17 Opening
18 Torque support
A Limit stop spoke
B Bending spoke
BA Fastening axis
D Strip strain gauges
V Projection
$W_1$, $W_2$ Bulge While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A torsion module of a torque detection device for a steering system of a motor vehicle, the torsion module comprising:

a spoked wheel having a hub and a rim, the spoked wheel having bending spokes which connect the rim to the hub, the bending spokes being bendable to enable the rim to rotate relative to the hub;

a first ring attachable to a steering wheel, the first ring being attached directly to a top side of the rim such that the first ring is integral with the top side of the rim and rotates with the rim relative to the hub in response to a torque applied to the steering wheel, wherein the first ring is void of any direct connection to the hub and is indirectly connected to the hub by the rim and the bending spokes;

a second ring attached directly to a bottom side of the rim such that the second ring is integral with the bottom side of the rim and rotates with the rim relative to the hub in response to a torque applied to the steering wheel, wherein the second ring is void of any direct connection to the hub and is indirectly connected to the hub by the rim and the bending spokes; and a measuring sensor placed on at least one of the bending spokes, the measuring sensor being operable for generating a signal as a function of a bending force experienced by the at least one of the bending spokes as the at least one of the bending spokes bends in response to a rotation angle offset between the hub and the rim as the rim rotates relative to the hub in response to a torque applied to the steering wheel;

the spoked wheel further having bending-resistant limit stop spokes placed alternately between the bending spokes, each bending-resistant limit stop spoke having a free end that protrudes radially from the hub towards the rim, the free ends of the bending-resistant limit stop spokes being engaged with respective regions of the rim in such a manner as to permit a rotational angle offset between the hub and the rim for the rim to rotate relative to the hub while limiting the maximum rotation angle offset between the hub and the rim;

the hub, the rim, the bending spokes, and the bending-resistant limit stop spokes of the spoked wheel being concentric to one another, wherein the rim and the bending-resistant limit stop spokes are placed such that they are located in one plane and have the same extent in the axial direction;

the first and second rings having inward-pointing projections adjacent to the regions of the rim engaged with the bending-resistant limit stop spokes to form axially separated limit stops which enclose the free ends of the bending-resistant limit stop spokes on the top and bottom sides of the rim in order to prevent axial movement between the hub and the rim.

2. The torsion module of claim 1 wherein:

the measuring sensors include strip strain gauges.

3. The torsion module of claim 2 wherein:

the strip strain gauges are placed on different sides of different ones of the bending spokes.

4. The torsion module of claim 1 wherein:

the first ring is a spacer ring.

5. The torsion module of claim 1 wherein:

each region of the rim engaged with a free end of a bending-resistant limit stop spoke includes a limit arrangement having two bulges that project inward from the rim.

6. The torsion module of claim 5 wherein:

the bulges of each limit stop arrangement are separated at a distance from each other leaving a limit stop gap.

7. The torsion module of claim 1 wherein:

the spoked wheel is insertable into a recess of the steering wheel, the recess having an inward-directed projection forming a torque support which positively engages into the rim of the spoked wheel.

* * * * *